United States Patent [19]

Kanouda et al.

[11] Patent Number: 5,559,682
[45] Date of Patent: Sep. 24, 1996

[54] MULTI-OUTPUT DC-DC CONVERTOR

[75] Inventors: Akihiko Kanouda, Katsuta; Tadashi Takahashi, Hitachi; Hideaki Horie, Hitachi; Kenichi Onda, Hitachi; Syuya Hagiwara, Mito, all of Japan

[73] Assignee: Hitachi, Ltd., Tokyo, Japan

[21] Appl. No.: 177,961

[22] Filed: Jan. 6, 1994

[30] Foreign Application Priority Data

Jan. 6, 1993 [JP] Japan .................... 5-000612

[51] Int. Cl.⁶ .................................. H02M 3/335
[52] U.S. Cl. .................................. 363/21; 363/89
[58] Field of Search .................. 363/20, 21, 19, 363/89, 56, 131, 49; 336/180, 229

[56] References Cited

U.S. PATENT DOCUMENTS

| | | | |
|---|---|---|---|
| 3,564,393 | 3/1969 | Williamson | 363/21 |
| 3,736,496 | 5/1973 | Lachocki | 363/21 |
| 4,245,285 | 1/1981 | Weiss | 323/222 |
| 4,374,355 | 2/1983 | Steigerwald et al. | 320/43 |
| 4,649,465 | 3/1987 | Kitou et al. | 363/21 |
| 4,652,809 | 3/1987 | Barn | 323/282 |
| 4,672,517 | 6/1987 | Mandelcorn | 363/20 |
| 5,012,125 | 4/1991 | Conway | 307/149 |
| 5,331,532 | 7/1994 | Iwai et al. | 363/20 |

Primary Examiner—Peter S. Wong
Assistant Examiner—Adolf Berhane
Attorney, Agent, or Firm—Antonelli, Terry, Stout & Kraus

[57] ABSTRACT

A diode, a condenser and a switching element are connected to a primary winding of a flat type transformer such as a wire type transformer. A citation energy discharged during an off-condition of the switching element, namely a reset period of the transformer, is accumulated in the condenser. An output voltage is obtained from the condenser. Two system direct current voltage output can be obtained from one transformer. Since the two system direct current voltage output can be obtained from the transformer having a pair of a primary winding and a secondary winding, the volume and the weight of the transformer can be reduced and the compact and the slim of the machine apparatus being mounted can be contributed. Making the small winding ratio of the transformer, the copper loss of the transformer can be reduced. By using MOS synchronous rectification, the loss in the circuit can be reduced. It is unnecessary to select highly the switching frequency.

17 Claims, 6 Drawing Sheets

MULTI-OUTPUT DC-DC CONVERTOR

BACKGROUND OF THE INVENTION

The present invention relates to a multi-output DC-DC convertor; and, more particularly, to a multi-output DC-DC convertor in which a transformer and other components mounted on the DC-DC convertor are constituted so as to be compact in size and of a thin type so as to operate as a power source of a handy information machine with a built-in DC-DC convertor.

In a conventional DC-DC convertor of the type used in a handy compact size information machine apparatus, such as a notebook type word processor or a personal computer, in general, a switching regulator circuit shown, for example, in Japanese utility model laid-open No. 64988/1992, is in wide use.

In the above-stated conventional machine, at first a direct current input is applied to a circuit in which a transformer and a switching element are connected in series, then the switching element performs an "on" motion or an "off" motion, so that, at a secondary side of the transformer, an alternating current signal having the same frequency as the frequency of the switching element can be obtained. Further, the obtained alternating current is rectified and supplied to a load.

As a method for controlling an output voltage in the above-stated conventional machine, it has been generally known that, in response to the up-and-down motion of the load voltage, the pulse width of the switching element at the primary side of the transformer is varied.

In the handy information processing machine apparatus, it is important for the machine to have a compact size and a thin type power source. However, the trouble with the power source is the size of the transformer used in the power source portion.

However, by using a transformer having no iron core, such as a wire type transformer having a construction in which a primary conductor and a secondary conductor are arranged in parallel, and wherein the primary conductor and the secondary conductor are wound in a plane, an extremely thin transformer can be realized.

However, when it is intended to obtain plural outputs from the above-stated wire-type transformer, it is necessary to couple plural secondary conductors with the primary conductor, to make the electric power transmission most effective. In practice, it is difficult to obtain the above-stated coupling, and further, it causes a problem in that the coupling coefficient between the primary winding and the secondary winding of the transformer decreases.

Further, a transformer having no iron core therein, such as a wire-type transformer, has a longer winding as compared with a transformer having an iron core therein, and also, when the winding ratio between the primary winding and the secondary winding of the transformer becomes large, it causes a problem in that the copper loss particularly at the secondary side of the transformer increases.

SUMMARY OF THE INVENTION

An object of the present invention is to provide a multi-output DC-DC convertor wherein the number of windings of the transformer can be minimized.

Another object of the present invention is to provide a multi-output DC-DC convertor wherein a compact size multi-output DC-DC convertor can be obtained.

A further object of the present invention is to provide a multi-output DC-DC convertor wherein a multi-output DC-DC convertor having a compact size, a slim shape and a low loss can be attained using few transformers and also no complicated circuitry.

According to the present invention, a multi-output DC-DC convertor comprises a transformer having a primary winding and a secondary winding, at least one switching element connected in series to the primary winding of the transformer, a first rectifying and smoothing circuit connected to the secondary winding of the transformer, and a second rectifying and smoothing circuit connected to at least one of the primary winding and the secondary winding of the transformer.

During an on-condition of the switching element, a first output is obtained by applying a current to the first rectifying and smoothing circuit, and during an off-condition of the switching element, a second output is obtained by applying a current to the second rectifying and smoothing circuit.

According to the present invention, a multi-output DC-DC convertor comprises a transformer having a primary winding and a secondary winding, at least one switching element connected in series to the primary winding of the transformer, a rectifying means, one terminals of the rectifying means being connected to an intermediate point between the primary winding of the transformer and the switching element, and an electrical charge accumulating means connected to another terminal of the rectifying means.

During an on-period of the switching element, a first output is obtained from both terminals of the secondary winding of the transformer, and during an off-period of the switching means, by transferring excitation energy accumulated in the primary winding of the transformer to the electrical charge accumulating means through the rectifying means, a second output is obtained from both terminals of the electrical charge accumulating means.

The transformer is constituted by winding together at least two wire-shaped conductors which are insulated from each other.

It is preferable to provide a transformer in which at least two mutually insulated wire-shaped conductors are constituted by overlapping at least two spiral-shaped conductor stages constituted by winding two conductors spirally into overlapping stages and connecting end portions corresponding to the overlapped stages of the wire-shaped conductors.

It is preferable to form the transformer by a first wire-shaped conductor as a core member and plural wire-shaped conductors which are wound along with the first wire-shaped conductor and insulated therefrom through an insulating coating.

In the multi-output DC-DC convertor, one terminal of the electrical charge accumulating means is connected to a low potential side of a given input direct current power source and the second output is connected to a negative potential as a standard under the low potential side of the input direct current power source.

In the multi-output DC-DC convertor, the switching elements comprise two elements, and thereby a double forward type convertor is constituted.

In the multi-output DC-DC convertor, the convertor further comprises a liquid crystal drive circuit, and the liquid crystal drive circuit is connected to a terminal being used to obtain a second output.

In the multi-output DC-DC convertor, the one terminal of the charge accumulating means is connected to a high potential side of a given input direct current power source.

In the multi-output DC-DC convertor, a synchronous rectifying circuit having at least two metal oxide semiconductor field effect transistors are provided on the secondary winding of the transformer, the synchronous rectifying circuit rectifies an alternating current induced in the secondary winding of the transformer.

In the multi-output DC-DC convertor, duty of the on-period of the switching element against a switching period of the switching element is more than 50%.

According to the present invention, a multi-output DC-DC convertor comprises, a transformer having a primary winding and a secondary winding, at least one switching element connected in series to the primary winding of the transformer, an open-close means, one terminal of the open-close means being connected to an intermediate point between the primary winding of the transformer and the switching element, and an electrical charge accumulating means connected to another terminal of the open-close means.

During an on-period of the switching element, a first output is obtained from both terminals of the secondary winding of the transformer, and during an off-period of the switching means, in response to transferring an excitation energy accumulated in the primary winding of the transformer to the electrical charge accumulating means through the open-close means, a second output is obtained from both terminals of the charge accumulating means.

According to the present invention, a multi-output DC-DC convertor comprises a transformer having a primary winding and a secondary winding, at least one switching element connected between an input direct current power source and the primary winding of the transformer, a rectifying means, one electrode of the rectifying means being connected to an intermediate point between the switching element and the primary winding of the transformer, an electrical charge accumulating means connected to another electrode of the switching element, a voltage stabilizing means connected to both ends of the electrical charge accumulating means, and, at the secondary side of the transformer a synchronous rectifying circuit using metal oxide semiconductor field effect transistors.

During an on-period of the switching element, a first output is obtained from both terminals of the secondary winding of the transformer, and during an off period of the switching means, by transferring excitation energy accumulated in the primary winding of the transformer to the electrical charge accumulating means through the rectifying means, a second output is obtained from both terminals of the electrical charge accumulating means.

The direct current inputted is applied to the primary winding of the transformer during the on-condition of the switching element.

When the switching element is in the off-condition, in a close circuit, including the rectifying means and the electrical charge accumulating means, a reset current of excitation energy of the transformer flows.

At this time, in the charge accumulating means, direct current is generated in response to the amount of electrical charge which is flowing.

By the above stated construction, at the reset period of the transformer, it is possible to apply more than the input voltage to the primary side of the transformer.

In the conventional forward type convertor, the reset period of the transformer requires 50% in one period within the on-and-off period of the switching element. However, according to the present invention, the reset period of the transformer is shortened to less than 20% and thereby it is possible to widen the on period of the switching element to more than 80%.

As a result, the winding ratio between the primary side and the secondary side of the transformer can be made smaller than that of the conventional machine and the transformer volume can be reduced and the copper loss in the interior portion of the winding can be reduced.

Further, at the secondary side of the transformer, a voltage of the electrical charge accumulating means applied during the reset period of the transformer and a high voltage in proportion to the winding ratio of the transformer are generated.

In the present invention, in place of the rectifying diode at the secondary side, a synchronous rectifying circuit having, for example, a MOSFET, is used, and by maintaining the high voltage resistant, the voltage drop caused by the diode can be restricted lower and the electric power can be reduced.

In accordance with the flat-type transformer having the wire-type transformer winding, comprising at least a pair of a primary winding and a secondary winding, since a two-system direct current voltage output can be obtained, it is possible to reduce the volume and the weight of the transformer; and further, a transform of compact size and slim shape can be achieved.

Further, since the winding ratio of the transformer is made small, the copper loss of the transformer can be reduced. Further, by using a MOS type synchronous rectifying circuit, the electric power used in the system can be reduced, and also the usable time can be increased.

Further, since it is unnecessary to select a higher switching frequency of the switching element, the multi-output DC-DC convertor can be provided at a low cost.

BRIEF DESCRIPTION OF THE DRAWINHS

DESCRIPTION OF THE INVENTION

Figure 1:
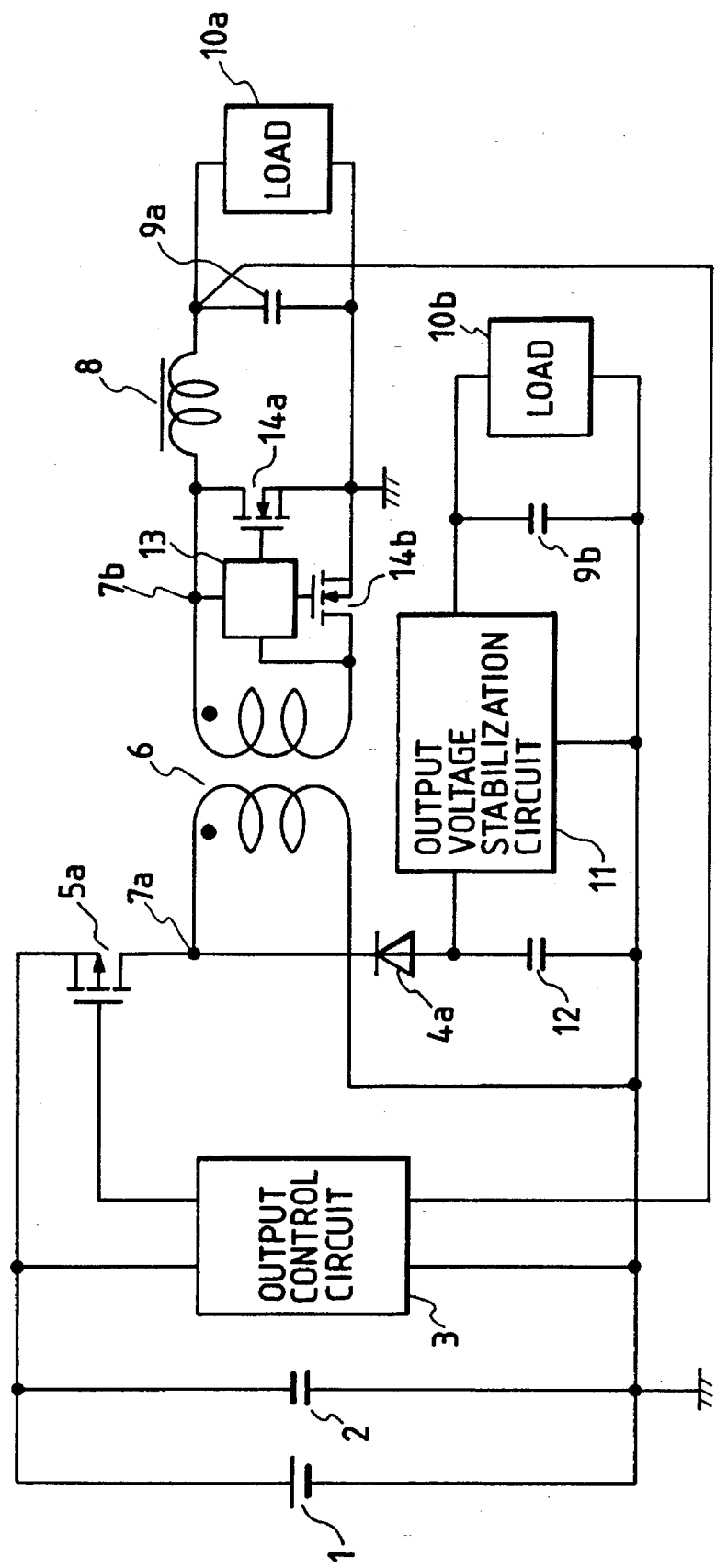
FIG. 1 is a schematic circuit diagram showing a first embodiment of a multi-output DC-DC convertor according to the present invention.

Hereinafter, one embodiment according to the present invention will be explained while referring to the drawings.

FIG. 1 shows a first embodiment of a multi-output DC-DC convertor, according to the present invention, constituting a two-output forward type convertor.

In FIG. 1, a two-output DC-DC convertor comprises an external direct current power source 1, an input smoothing condenser 2, an output controlling circuit 3, a diode 4a, P-channel MOSFET (metal oxide semiconductor field effect transistor) 5a, a flat type transformer 6, and connecting points 7a and 7b.

The two-output DC-DC convertor comprises further an output smoothing choke coil 8, output smoothing condensers 9a and 9b, outside loads 10a and 10b connected to an external system, an output voltage stabilizing circuit 11, for example a three-terminal regulator, a condenser 12, a synchronous rectifying drive circuit 13, and synchronous rectifying MOSFET devices 14a and 14b.

The output controlling circuit 3 performs an on/off control of a P-channel MOSFET (metal oxide semiconductor field effect transistor) 5a. The synchronous rectifying drive circuit 13 rectifies an output voltage of a secondary side of the flat type transformer 6.

The on/off control of the output controlling circuit 3 and the rectifying control of the synchronous rectifying drive circuit 13 are realized by using electronic devices, such as resistors, condensers, coils, various kinds of C-MOS (complementary metal oxide semiconductor) devices, various kinds of TTL (transistor-transistor logic) devices and exclusive IC (integrated circuit) etc. devices, for example.

Further, the input smoothing condenser 2 and the output controlling circuit 3 are connected across the terminals of the external direct current power source 1.

Further, the positive terminal of the external direct current power source 1 is connected to the source electrode of the P-channel MOSFET 5a; and, at the connecting point 7a, the drain electrode of the P-channel MOSFET 5a is connected to one terminal of the primary winding of the flat type transformer 6 and to the cathode electrode of the diode 4a.

Herein, the description relates to the construction in which the winding ratio between the primary winding and the secondary winding of the flat transformer 6 is 1:2. However, the present invention has equal application to a construction having a winding ratio other than above-stated construction.

One terminal at the primary winding of the flat transformer 6 is connected to the negative terminal of the external direct current source 1. Further, the anode electrode of the diode 4a is connected to one terminal of the condenser 12, and another terminal of the condenser 12 is connected to the negative terminal of the external direct current source 1.

The output voltage stabilizing circuit 11 is connected to both sides of the condenser 12. The output smoothing condenser 9b is connected between an output terminal of the output voltage stabilizing circuit 11 and the negative terminal of the external direct current source 1. The outside load 10b is connected across the input smoothing condenser 9b.

The source electrode of the synchronous rectifying MOSFET 14a and the source electrode of the synchronous rectifying MOSFET 14b are connected in common. The synchronous rectifying drive circuit 13 and the synchronous rectifying MOSFET devices 14a and 14b are connected to respective ends of the secondary winding of the flat transformer 6.

Further, the output smoothing choke coil 8 and the output smoothing condenser 9a are connected in series across the synchronous rectifying MOSFET 14a, the connecting point in the series connection being connected to the output controlling circuit 3.

Each of the gate terminals of the synchronous rectifying MOSFET 14a and 14b is connected to an output of the synchronous rectifying drive circuit 13, respectively. The outside load 10a is connected across the output smoothing condenser 9a.

Further, the negative terminal of the output smoothing condenser 9a is connected to the negative terminal of the external direct current source 1 via ground. The positive terminal of the output smoothing condenser 9a is connected to the output controlling circuit 3.

Figure 2:
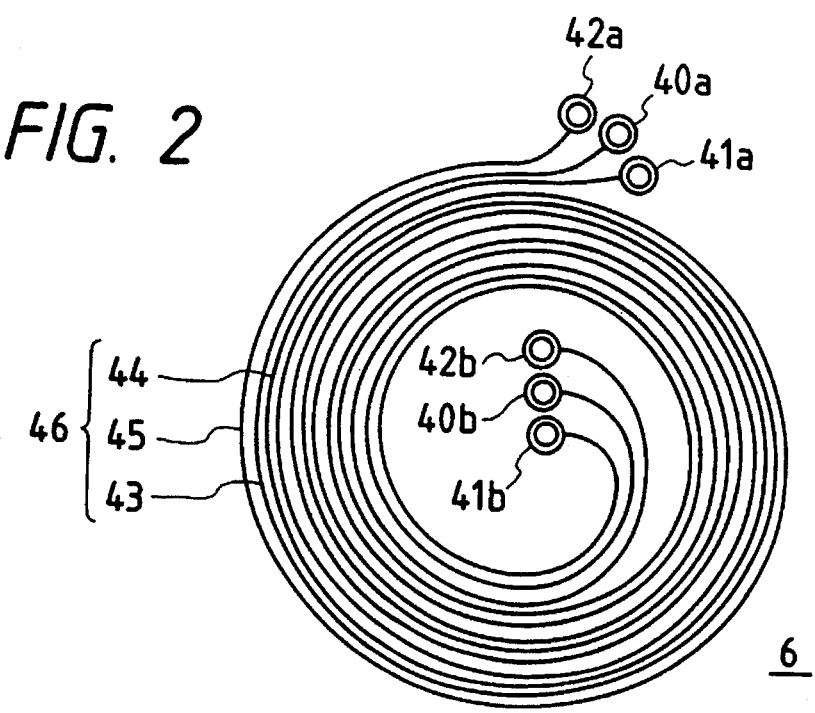
FIG. 2 is a diagram showing one embodiment of a wire-type transformer which may be used in a multi-output DC-DC convertor according to the present invention.

Next, FIG. 2 shows a wire-type transformer construction which forms one example of the transformer 6 used in this embodiment.

In FIG. 2, a wire-type transformer comprises a complex conductor 46 having a first wire-shaped conductor (a primary conductor) 43, a second wire-shaped conductor (a first secondary conductor) 44 and a third wire-shaped conductor (a second secondary conductor) 45.

Namely, the primary conductor 43 has terminals 40a and 40b at respective ends of the primary conductor 43. The first secondary conductor 44 is wound in the plane of and in contact with the primary conductor 43, and this first secondary conductor 44 has terminals 41a and 41b at respective ends thereof. The second secondary conductor 45 is wound in the plane of and in contact with the first secondary conductor 44, and this second secondary conductor 45 has terminals 42a and 42b at respective ends thereof.

Each of the surfaces of the primary conductor 43, the first secondary conductor 44 and the second secondary conductor 45 is provided with an insulating coating, and further, each of the respective insulating coating portions forms an electrical insulating condition.

The first secondary conductor 44 and the second secondary conductor 45 are arranged on either side the primary conductor 43, and the first secondary conductor 44 and the second secondary conductor 45 are wound spirally. The terminal 41a of the first secondary conductor 44 and the terminal 42b of the second secondary conductor 45 are connected at an outside portion.

As a result, the flat type transformer 6, having a wire-type transformer construction, is formed. In this embodiment, the flat type transformer 6 has terminals 40a and 40b as primary side terminals and terminals 42a and 41b as secondary side terminals. This flat type transformer 6 has a winding ratio of 1:2.

Figure 3:
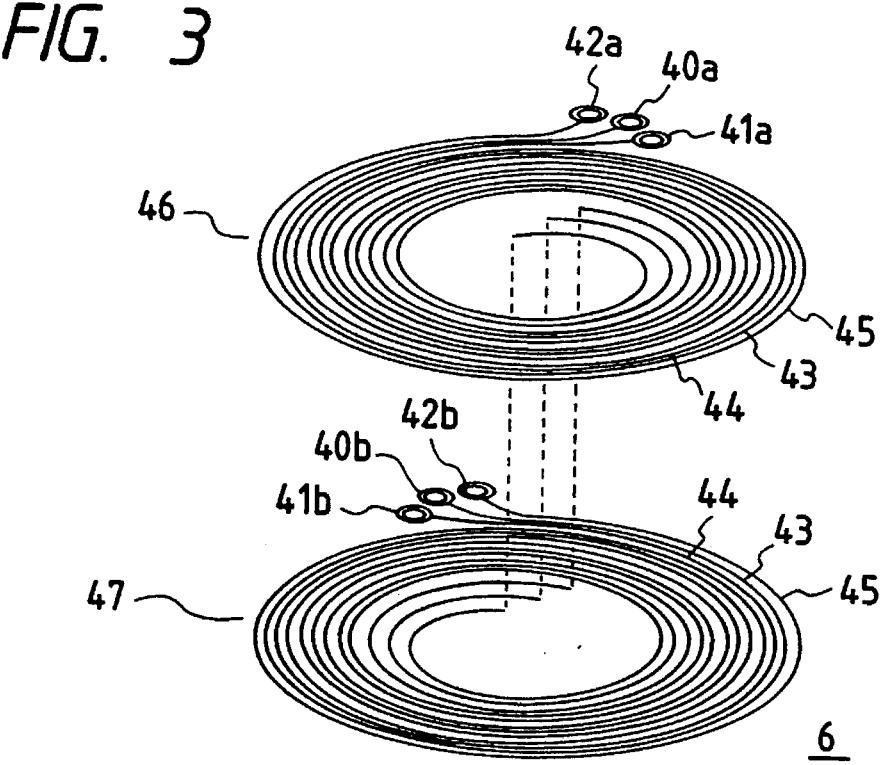
FIG. 3 is a diagram showing another embodiment of a wire-type transformer which may be used in a multi-output DC-DC convertor according to the present invention.

FIG. 3 is a construction showing another embodiment of a flat-type transformer. The flat-type transformer according to this embodiment has a construction in which the flat-type transformer of the above-stated wire-type transformer construction has a laminated, two stage construction. In FIG. 3, the same structural elements corresponding to the structural elements shown in FIG. 2 are denoted with the same reference numerals.

The flat type transformer 6 comprises an upper complex conductor 46 and a lower complex conductor 47. Each of the upper complex conductor 46 and the lower complex conductor 47 forms a wound body including a primary conductor and a secondary conductor, respectively.

Each of the upper complex conductor 46 and the lower complex conductor 47 is formed with a spiral shape construction in a reverse form with respect to each other. By positioning them closely and laminating the upper complex conductor 46 and the lower complex conductor 47, the terminal 41a of the first secondary conductor 44 and the terminal 42b of the second secondary conductor 45 are connected at an outside portion. Thereby, the terminal 40a of the first secondary conductor 44 and the terminal 42b of the second secondary conductor 45 are made to form the primary side terminals and the terminal 42a of the second secondary conductor 45 and the terminal 41b of the first secondary conductor 44 are made to form the secondary side terminals, respectively. This flat type transformer 6 has a winding ratio of 1:2. In this embodiment, the flat type transformer 6 has a laminated, two stage construction, however it can constitute similarly a transformer having a laminated construction with more than three stages.

Figure 4:
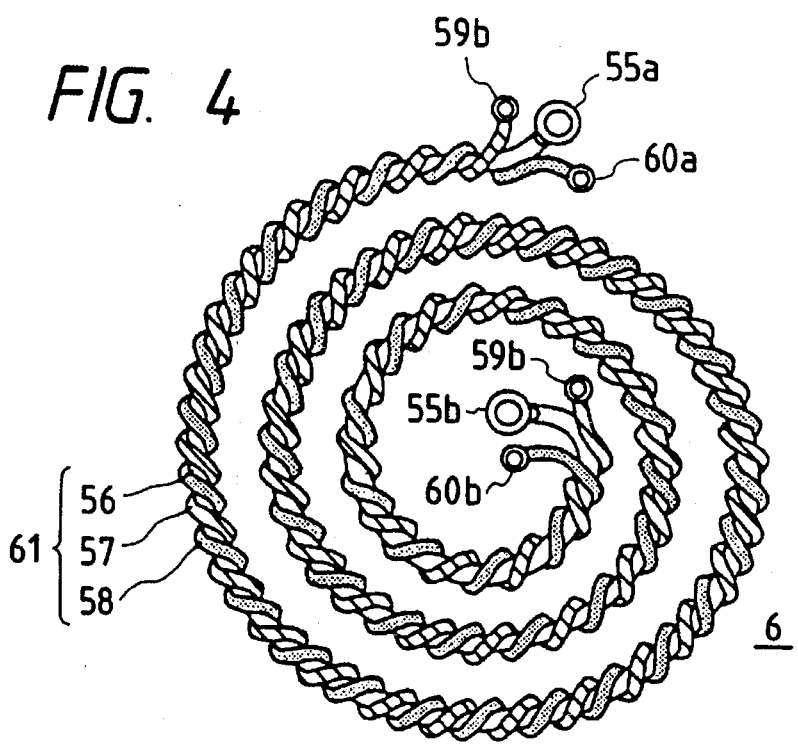
FIG. 4 is a diagram showing a further embodiment of a wire type transformer used in a multi-output DC-DC convertor according to the present invention.

FIG. 4 shows a wire type transformer construction which forms another example of a flat-type transformer used in this embodiment.

In FIG. 4, a wire transformer comprises a complex conductor 61 having a first wire-shaped conductor (a central conductor) 56, a second wire-shaped conductor (a first peripheral conductor) 57 and a third wire-shaped conductor (a second peripheral conductor) 58.

Namely, the central conductor 56 as a core member has terminals 55a and 55b at respective ends thereof. The first peripheral conductor 57 is wound in the plane of and in contact with the central conductor 56, and this first peripheral conductor 57 has terminals 59a and 59b at respective ends thereof. The second peripheral conductor 58 is wound in the plane of and in contact with the central conductor 56, and this second peripheral conductor 58 has terminals 60a and 60b at respective ends thereof.

Each of the surfaces of the central conductor 56, the first peripheral conductor 57 and the second peripheral conductor 58 is provided with an insulating coating, and further the respective portion between the conductors is held in an electric insulating condition.

The first peripheral conductor 57 and the second peripheral conductor 58 are wound spirally around the central conductor 56, and the above stated complex conductor 61 is constituted to have the concentrically spiral shape. The complex conductor 61 is wound spirally in a plane. The terminal 60a of the first peripheral conductor 57 and the terminal 59b of the second peripheral conductor 58 are connected at an outside portion.

As a result, the flat type transformer 6 having a wire-type transformer construction is formed. In this embodiment, the flat type transformer 6 has the terminals 55a and 55b of the central conductor 56 as the primary side terminals and terminals 60a and 60b of the second peripheral conductor 58 as the secondary side terminals. This flat type transformer 6 has a winding ratio of 1:2.

Figure 5:
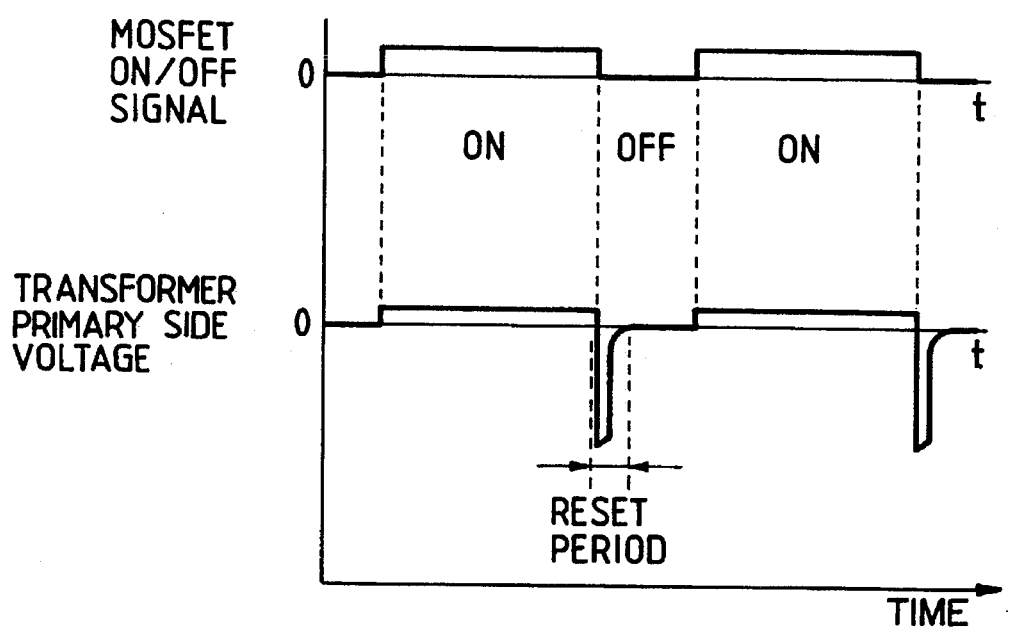
FIG. 5 is a time-chart showing an on/off signal of a P channel MOSFET and a voltage waveform of a primary winding of a flat-type transformer.

Next, FIG. 5 is a time-chart of a signal waveform to explain the operation of this embodiment. In this figure, an upper portion is an on/off signal of P-channel MOSFET 5a and a lower portion is a voltage waveform at the primary side of the flat type transformer 6 (transformer primary side voltage) in response to the on/off signal of the P-channel MOSFET 5a.

Herein, the operation according to this embodiment will be explained referring to FIG. 1 to FIG. 5.

At first, the voltage inputted from the external direct current power source 1 is smoothed by the input smoothing condenser 2 and is applied to the output controlling circuit 3. As the external direct current power source 1, a battery or AC-DC convertor etc. can be employed, and the voltage of the external direct current power source 1 has, for example, a direct current voltage of 5–12 V.

The output controlling circuit 3 is constituted by, for example, an electronic device, such as a TTL, an exclusive IC and the like, and can adjust the timing for switching the P-channel MOSFET 5a to maintain the value of the output voltage constant.

Namely, the output controlling circuit 3 is connected to a gate terminal of the P-channel MOSFET 5a. By decreasing the voltage of the gate terminal to the voltage of the negative pole side of the input smoothing condenser 2, it can force P-channel MOSFET 5a to an on-condition, whereby the voltage between both terminals of the input smoothing condenser 2 is applied to the primary winding of the flat type transformer 6 as it is.

At this time, when the winding ratio between the primary winding and the secondary winding of the flat type transformer 6 is 1:2, a voltage is induced across the secondary winding of the flat type transformer 6, which voltage is about two times the voltage across the terminals of the input smoothing condenser 2. This voltage is applied to the synchronous rectifying drive circuit 13.

Herein, the synchronous rectification is designed to function like a diode equivalently using an active element, for example, an element such as MOSFET, a bipolar transistor and the like.

The synchronous rectifying drive circuit 13 having the above-stated function can be realized by, for example, a construction having plural MOSFET devices. In this embodiment, the synchronous rectifying drive circuit 13 switches the synchronous rectifying MOSFET devices 14a and 14b, and further performs the rectifying function.

When a voltage is applied to the synchronous rectifying drive circuit 13, the synchronous rectifying MOSFET 14b is switched to the on-condition, and then the current flows from the source electrode side to the drain electrode side.

As a result, across the secondary side terminals of the flat type transformer 6, the output smoothing choke coil 8 (in this case, this choke coil works as a kind of low-pass filter), the output smoothing condenser 9a and the synchronous rectifying MOSFET 14b, are connected in series, and a current flows in this loop circuit. Further, the voltage of the output smoothing condenser 9a is supplied to the outside load 10a.

As stated above, the output controlling circuit 13 operates to provide "on" and "off" control of the P-channel MOSFET 5a with a predetermined frequency. The flat type transformer 6, having the wire-type transformer construction, increases abruptly the coupling efficiency (namely, the electric power transmission efficiency) between the primary winding and the secondary winding of the flat type transformer 6, when the repeat frequency of the applied intermittent direct current becomes more than several 10 kHz.

Accordingly, it is preferable to set the switching signal (pulse signal for switching) of the P-channel MOSFET 5a at more than 100 kHz.

When the P-channel MOSFET 5a is changed to the off-condition, at the primary side of the flat type transformer 6, the excitation energy of the coil is discharged through the series circuit comprising the condenser 12 and the diode 4a, and the voltage at the primary side of the flat type transformer 6 becomes a waveform as shown in the lower portion in FIG. 5. Accordingly, the negative pole side of the input smoothing condenser 2 (in FIG. 1, the earth side) is charged to an electrical charge of higher potential.

This voltage is stabilized by the output voltage stabilizing circuit 11 (namely, a three-terminal regulator) and another output is produced across the output smoothing condenser 9b, and this output is supplied to the outside load 10b. At this time, when the electrical charging direction of the output smoothing condenser 9b is taken into the consideration, a negative voltage (for example, −22 V etc.) is supplied to the outside load 10b.

Besides, since there is a coupling through the flat type transformer 6 between the primary winding and the secondary winding, the cathode electrode of the diode 4a connected to the connecting point 7a of the primary side winding of the flat type transformer 6 is effectively connected to the connecting point 7b of the secondary winding. However, even when the cathode electrode of the diode 4a is connected to the connecting point 7b, it is possible to obtain a similar output.

In this time, at the secondary side of the flat type transformer 6, a high voltage is generated, and the value of this high voltage is two times the voltage value which exists across the terminals of the condenser 12.

This high voltage is applied between the drain electrode and the source electrode of the synchronous rectifying MOSFET 14b. In general, as the diode for use in this arrangement, a Schottky barrier diode having a low on-voltage may be used, however in accordance with the present invention, it is not preferable to use the Schottky barrier diode having a low voltage resistance. Besides, in a Schottky barrier diode having a high voltage resistance, since the on-voltage becomes higher, an electric power loss generated in this diode causes a problem.

As a result, in accordance with the present invention, a synchronous rectifying MOSFET is used, and since it can provide a high voltage resistance and a low on-voltage, it provides the circuitry construction in which the electric power loss of the rectifying circuit at the secondary side can be reduced.

Further, during the off-period of the P-channel MOSFET 5a, the energy accumulated in the output smoothing choke coil 8 can circulate through the synchronous rectifying MOSFET 14a and the primary side of the output smoothing choke coil 8.

The control of the output controlling circuit 3 is effected in response to the voltage across the output smoothing condenser 9a, by comparing the inputted voltage and a standard voltage in the output controlling circuit 3, and further by varying the on-off duty of P-channel MOSFET 5a in response to the result of this comparison.

In a general forward type converter, when the transformer is operating in a reset period, a reset winding provided separately is used, and also, so as to ensure the reset period, it is necessary to set the on-period of MOSFET at less than 50%.

Namely, in general, at the time of use of the transformer, it is necessary to provide the reset period to have a voltage-time equal to the product of the applied voltage at the primary side and the applied time of this voltage.

It is necessary to make equal the value of the product of the voltage and the time at the reset period, so as to avoid saturation in the transformer.

In accordance with the present invention, as the above stated circuitry apparatus is employed, as shown in FIG. 5, it is possible to apply a very much higher voltage to the transformer than the input direct current voltage, at the reset period of the transformer.

Since the voltage-time product is constant, it is possible to shorten the reset period about 20% of one period (switching period of the switching element).

For the above stated reasons, it is possible to allow the on-period of the P-channel MOSFET 5a at 80% exceeding 50% of one period. As a result, in the prior art circuit, it is necessary for the winding ratio between the primary winding and the secondary winding to be more than 1:3.

Besides, in accordance with the present invention, it is possible to decrease the winding ratio between the primary winding and the secondary winding to less than 1:2, and further, by shortening the secondary winding, an effect for reducing the iron loss in the interior portion of the winding can be obtained.

Since the voltage which appears across the output smoothing condenser 9b is a negative voltage with respect to the voltage at the negative pole of the input smoothing condenser 2, it is suitable to employ this convertor as a power source for a liquid crystal display drive circuit for use in a handy information machine apparatus.

As stated above, it is possible to provide a two-output DC-DC converter which is responsive to two kinds of loads.

Figure 6:
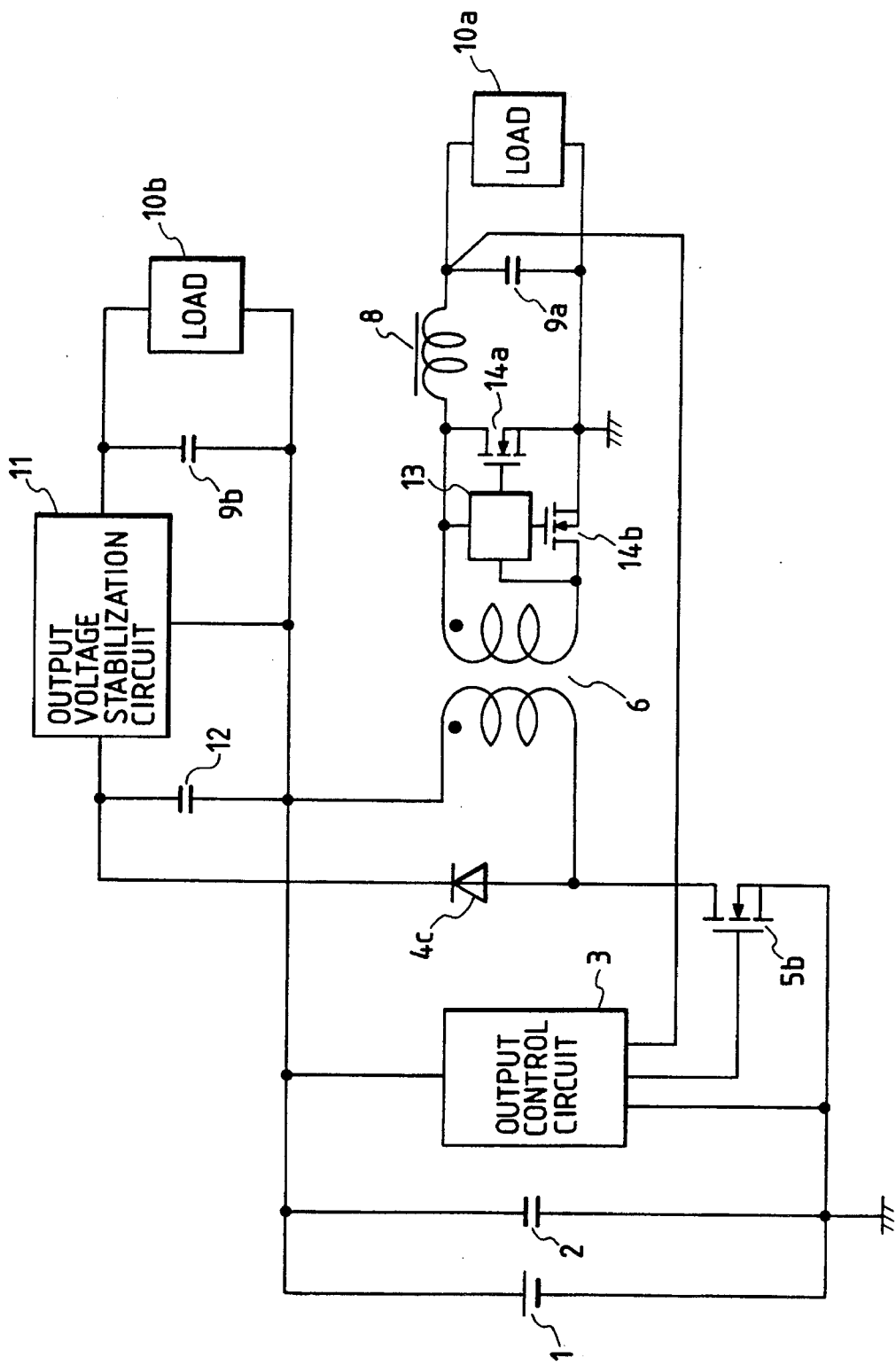
FIG. 6 is a schematic circuit diagram showing a second embodiment of a multi-output DC-DC convertor according to the present invention.

Next, FIG. 6 is a schematic circuit diagram showing a second embodiment of a multi-output DC-DC converter according to the present invention.

In FIG. 6, the multi-output DC-DC converter comprises a diode 4c and a N-channel MOSFET 5b, and other structural elements corresponding to structural elements shown in FIG. 1, which are denoted with the same reference numerals.

Further, the differences between this second embodiment and the first embodiment are as follows. In the first embodiment, a P-channel MOSFET 5a is used, whereas in this second embodiment, an N-channel MOSFET 5b is used.

By using the N-channel MOSFET 5b, the source electrode of the N-channel MOSFET 5b is connected to the low voltage side of the external direct current power source 1, the point of connection of the drain electrode of the N-channel MOSFET 5b and the primary winding of the flat type transformer 6 is connected to the an anode side of the diode 4c.

Further, the positive pole side of the condenser 12 is connected to the positive terminal of the external direct current power source 1. The output voltage stabilizing circuit 11, the output smoothing condenser 9b and the outside portion 10b are connected together to the positive terminal of the external direct current power source 1 operating as the standard voltage source.

Except for the above stated differences, there is no structural difference between this second embodiment and the above stated first embodiment.

In this second embodiment, as compared with the P-channel MOSFET, since the N-channel MOSFET 5b having a low on-resistance is used, a reduction of the electric power loss can be attained.

Further, taking into consideration that the standard voltage of the condenser 9b is output at the positive terminal of the external direct current power source 1, in the construction shown in FIG. 6, it can function as a power supply source for driving an inverter apparatus, in other words to a charge pump circuit.

Further, in this second embodiment, it is possible to use also the flat type transformer 6 having wire-type transformer construction as shown in FIG. 2, FIG. 3 and FIG. 4.

The operation of the embodiment shown in FIG. 6 is essentially similar to the operation of the first embodiment. Namely, when the N-channel MOSFET 5b switches to the off-condition, the excitation energy of the flat type transformer 6 is accumulated in the condenser 12 through diode 4c and the output of the condenser 12 is supplied to the outside load 10b through the output voltage stabilizing circuit 11 and the output smoothing condenser 9b.

As stated above, in this second embodiment, it is possible to obtain two outputs, that is, one output with the positive terminal of the external direct current power source 1 as the standard voltage and another output with the negative terminal of the external direct current power source 1 as the standard voltage.

Figure 7:
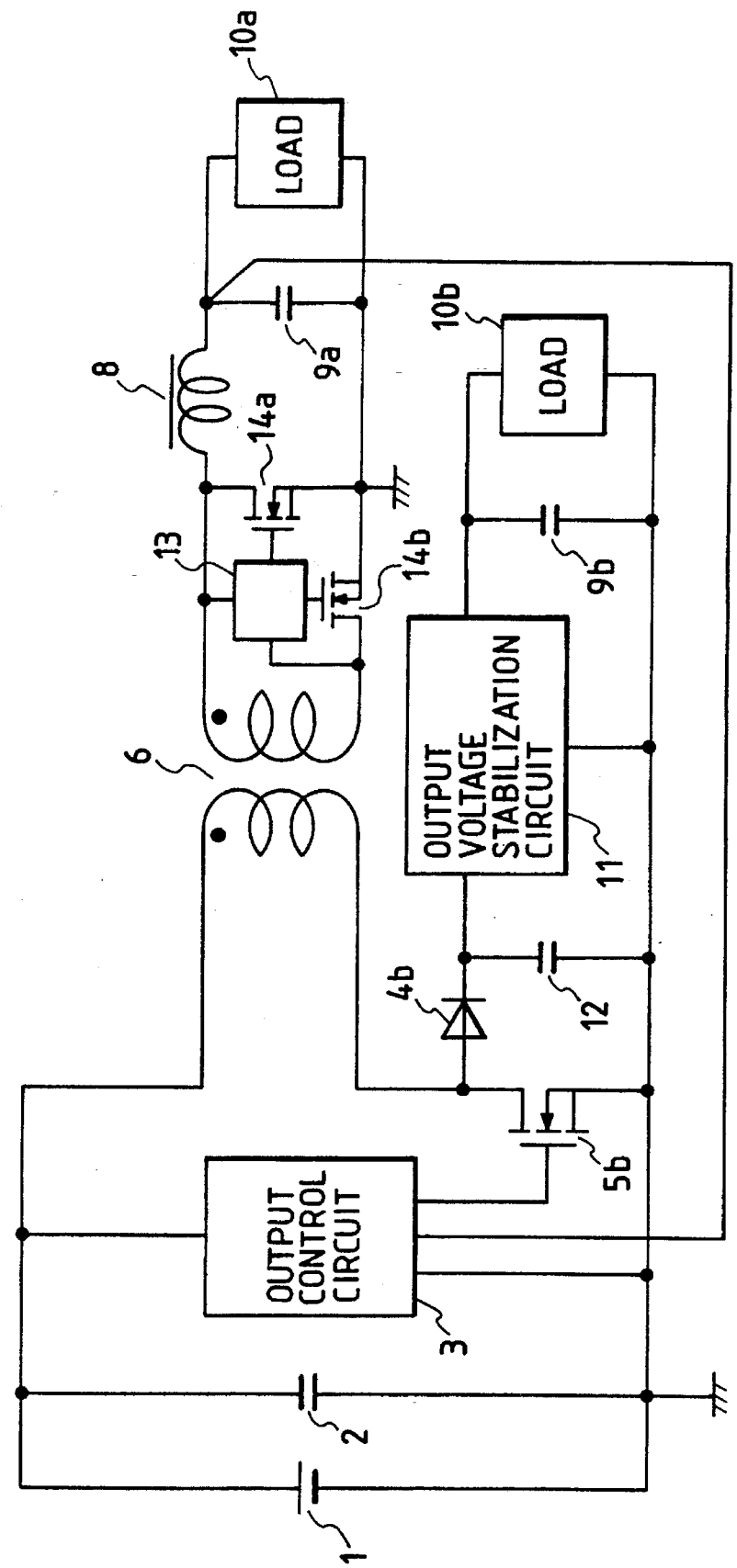
FIG. 7 is a schematic circuit diagram showing a third embodiment of a multi-output DC-DC convertor according to the present invention.

Next, FIG. 7 shows a third embodiment of a multi-output DC-DC converter according to the present invention.

In FIG. 7, structural elements corresponding to the structural elements shown in FIG. 1 and FIG. 2 are denoted with the same reference numerals.

Further, the differences between this third embodiment and the first embodiment are as follows. In the first embodiment, a P-channel MOSFET 5a is used, whereas in this third embodiment, an N-channel MOSFET 5b is used.

By using the N-channel MOSFET 5b, the primary winding of the flat type transformer 6 is connected to the high voltage side of the external direct current power source 1, and the N-channel MOSFET 5b is connected to the low voltage side of the external direct current power source 1.

Further, the anode electrode of the diode 4b is connected to the connecting point of the primary winding of the flat type transformer 6 and the drain electrode of the N-channel MOSFET 5b, and the condenser 12 is connected to the cathode electrode of the diode 4b.

Except for the above stated differences, there is no structural difference between this third embodiment and the above stated first embodiment.

The operation of this third embodiment is essentially similar to the operation of the above stated first embodiment.

Namely, when the N-channel MOSFET 5b switches to the off-condition, the excitation energy of the flat type transformer 6 is accumulated in the condenser 12 as an electrical charge through the diode 4b, and the output of the condenser 12 is supplied to the outside load 10b through the output voltage stabilizing circuit 11 and the output smoothing condenser 9b.

Besides, at the reset period of the flat type transformer 6, the reset current flows on a path through the primary winding of the flat type transformer 6, the diode 4b, the condenser 12 and the input smoothing condenser 2, and this is a difference in the third embodiment as compared to the first embodiment.

Further, as a result, the voltage charge in the condenser 12 becomes a high potential at a side connected to the diode 4b. Each of the voltages supplied to the outside loads 10a and 10b becomes a positive voltage acting as the standard potential under a low potential side of the input smoothing condenser 2.

Further, in this third embodiment, it is possible to employ also the flat type transformer 6 having the wire-type transformer construction as shown in FIG. 2, FIG. 3 and FIG. 4.

According to this third embodiment, since a N-channel MOSFET 5b having a low input resistance is used, it is possible to obtain effects in which the electric power loss can be reduced, and further a high surge voltage can be bypassed.

Figure 8:
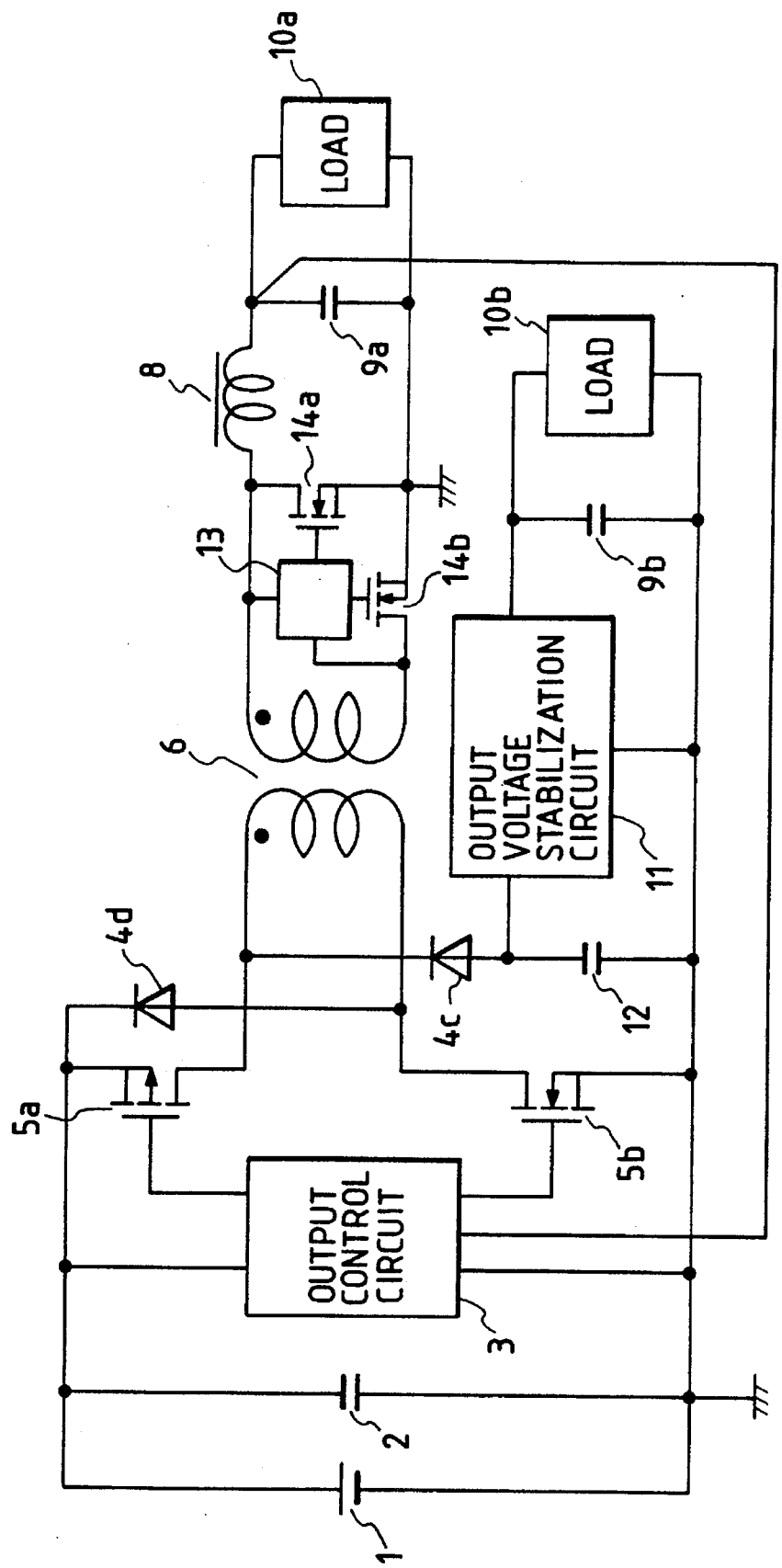
FIG. 8 is a schematic circuit diagram showing a fourth embodiment of a multi-output DC-DC convertor according to the present invention.

Further, FIG. 8 shows a fourth embodiment of a multi-output DC-DC converter according to the present invention. This construction constitutes a multi-output converter having for a large capacity, which is a double that of the forward-type converter using two switching elements.

In FIG. 8, structural elements corresponding to the structural elements shown in FIG. 1 and FIG. 2 are denoted with the same reference numerals.

Further, the differences between this fourth embodiment and the first embodiment are as follows. In the first embodiment a P-channel MOSFET 5a is used, whereas in this fourth embodiment a P-channel MOSFET 5a and an N-channel MOSFET 5b are used, and they constitute a double forward-type converter.

P-channel MOSFET 5a is connected to the high potential side of the external direct current power source 1 and the N-channel MOSFET 5b is connected to the low potential side of the external direct current power source 1. The primary winding of the flat type transformer 6 is connected to the P-channel MOSFET 5a and the N-channel MOSFET 5b.

Further, the cathode electrode of the diode 4c is connected to the point of connection the primary winding of the flat type transformer 6 and the drain electrode of the P-channel MOSFET 5a, and the condenser 12 is connected to the anode electrode of the diode 4b. Further, the anode electrode of the diode 4d is connected to the point of connection of the primary winding of the flat type transformer 6 and the drain electrode of the N-channel MOSFET 5b, and the cathode electrode of the diode 4b is connected to the high potential side of the external direct current power source 1.

The operation of this fourth embodiment is essentially similar to the operation of the above stated first embodiment.

Namely, when the N-channel MOSFET 5b switches to the off-condition, the excitation energy accumulated in the flat type transformer 6 is accumulated in the condenser 12 as an electrical charge through the diode 4d and the input smoothing condenser 2, and the output of the condenser 12 is supplied to the outside load 10b through the output voltage stabilizing circuit 11 and the output smoothing condenser 9b.

In this fourth embodiment, the voltage charge on the condenser 12 becomes a high potential at a side connected to the diode 4c. The voltage supplied to the outside load 10b becomes a negative voltage serving as the standard potential under the low potential side of the input smoothing condenser 2.

According to this fourth embodiment, it is possible to obtain an effect in which a multi-output DC-DC convertor having a large capacity and which is surge voltage resistant can be constituted.

Further, in this fourth embodiment, it is possible to use also the flat type transformer 6 having the wire-type transformer construction as shown in FIG. 2, FIG. 3 and FIG. 4.

Besides, in each of the above stated embodiments, the flat type transformer 6, for use in a multi-output DC-DC convertor, has had a wire-type transformer construction, however the flat-type transformer is not limited to a wire-type transformer construction. It can use various kinds of constructions, for example a construction using a conductor having a four-sided shape or a transformer having a shape in which a wire-type transformer is covered by a magnetic body.

As explained above, according to the present invention, it is possible to utilize the excitation energy accumulated in the flat-type transformer, such as a wire-type transformer, and it is possible to obtain a voltage output from a simple construction connected to the primary side or the secondary side of the transformer, which is separated from the voltage output obtained by the secondary side of the transformer.

In the above embodiments, flat-type transformer is explained, however it is possible to use a common type transformer. Further, in place of the diode, it is possible to employ an open-close means, such as an analog switch and a transistor, and this open-close means is opened or closed at a predetermined timing.

By using the flat-type transformer having a wire-type transformer construction comprising a pair of the primary winding and the secondary winding, a two-system direct current voltage output can be obtained. Accordingly, it is possible to reduce extremely the volume and the weight of the transformer, and it is possible to provide a compact size, slim shape and light weight for the apparatus on which the multi-output DC-DC convertor is mounted. Further, the present invention os applicable to a flat-type transformer having plural secondary windings.

Further, since it is possible to use a transformer having a small winding ratio, in addition to the reduction of the copper loss of the transformer, with use of a MOS type synchronous rectifying circuit in the rectifying circuit at the secondary side necessary for high voltage resistance, a reduction of the electric power in the circuit system can be attained.

As a result, when the flat-type transformer is installed in a handy information processing machine, such as a personal computer and a word processor, the consumption of electric power in such a machine can be reduced, and also the use time can be increased.

Further, when the multi-output DC-DC convertor is designed to be compact, it is unnecessary to select a higher switching frequency of the switching element, and, at the same time, the multi-output DC-DC convertor can be constituted at a low cost.

We claim:

1. A multi-output DC-DC convertor for supplying a first direct current to a first load and a second direct current to a second load, comprising:

a pair of input terminals, a first pair of output terminals which pair is different from said pair of input terminals, and a second pair of output terminals which pair is different from said pair of input terminals;

a transformer having a primary winding and a secondary winding;

at least one switching dement connected in series with said primary winding of said transformer such that a series circuit of said primary winding and said at least one switching element are connected to a direct current power source across said pair of input terminals;

a first rectifying and smoothing circuit connected to said secondary winding of said transformer; and a second rectifying and smoothing circuit connected to rectify and smooth an output selected from said primary winding and said secondary winding of said transformer; wherein during an on-condition of said switching dement, a first direct current output is obtained across said first pair of output terminals due to a current flowing in said first rectifying and smoothing circuit, said first direct current output for delivery to said first load; and during an off-condition of said switching dement, a second direct current output is obtained across said second pair of output terminals due to a current flowing to said second rectifying and smoothing circuit, said second direct current output for delivery to said second load.

2. A handy type information machine apparatus having the multi-output DC-DC convertor according to the invention defined in the independent claim 1.

3. A word processor machine having the multi-output DC-DC convertor according to the invention defined in the independent claim 1.

4. A personal computer machine having the multi-output DC-DC convertor according to the invention defined in the independent claim 1.

5. A multi-output DC-DC convertor for supplying a first direct current to a first load and a second direct current to a second load, comprising:

a pair of input terminals, a first pair of output terminals which pair is different from said pair of input terminals, and a second pair of output terminals which pair is different from said pair of input terminals;

a transformer having a primary winding and a secondary winding;

at least one switching element connected in series with said primary winding of said transformer such that a series circuit of said primary winding and said at least one switching element are connected to a direct current power source across said pair of input terminals;

a rectifying circuit having a first terminal connected to an intermediate point between said primary winding of said transformer and said switching element; and an electrical charge accumulating device connected in series with a second terminal of said rectifying circuit;

wherein during an on-period of said switching element, a first direct current output is obtained from both terminals of said secondary winding of said transformer for deriving said first direct current and supplying said first direct current across said first pair of output terminals for said first load, and during an off-period of said switching element, by the transfer of excitation energy accumulated in said primary winding of said transformer to said electrical charge accumulating device through said rectifying circuit, a second direct current output is obtained from both terminals of said electrical charge accumulating device for deriving said second direct current and supplying said second direct current across said second pair of output terminals for said second load.

6. A multi-output DC-DC convertor according to any one of claims 1 and 5, wherein said transformer is constituted by winding together at least two wire shaped conductors which are mutally insulated from each other.

7. A multi-output DC-DC convertor according to claim 6, wherein said at least two mutually insulated wire-shape conductors are arranged by overlapping at least two stages of a spiral wound conductor constituted by winding respective conductors spirally and connecting end portions thereof.

8. A multi-output DC-DC convertor according to any one of claims 1 and 5, wherein said transformer is constituted by a first wire-shaped conductor as a core member and a plural wire-shaped conductors which are wound around said first wire-shaped conductor, at least two of said wire-shaped conductors having an insulating coating.

9. A multi-output DC-DC convertor according to claim 5, wherein one terminal of said electrical charge accumulating device is connected to a low potential side of a direct current power source, and said second direct current output is said negative potential with respect to said low potential side of said direct current power source.

10. A multi-output DC-DC convertor according to claim 5, wherein two switching elements are connected in series with said primary winding, whereby a double forward-type convertor is constituted.

11. A multi-output DC-DC convertor according to any one of claims 9 and 10, further comprising a liquid crystal drive circuit connected to a terminal from which said second direct current output is obtained.

12. A multi-output DC-DC convertor according to claim 5, wherein one terminal of said electrical charge accumulating device is connected to a high potential side of said input direct current power source.

13. A multi-output DC-DC convertor according to claim 5, wherein a synchronous rectifying circuit, having at least two metal oxide semiconductor field effect transistors, is connected to said secondary winding of said transformer, said synchronous rectifying circuit operating to rectify an alternating current induced in said secondary winding of said transformer.

14. A multi-output DC-DC convertor according to claim 5, wherein the on-period of said switching element is more than 50% of the switching period of said switching element.

15. A multi-output DC-DC convertor for supplying a first direct current to a first load and a second direct current to a second load, comprising:

a pair of input terminals, a first pair of output terminals which pair is different from said pair of input terminals, and a second pair of output terminals which pair is different from said pair of input terminals;

a transformer having a primary winding and a secondary winding;

at least one switching element connected in series with said primary winding of said transformer such that a series circuit of said primary winding and said at least one switching element are connected to a direct current power source across said pair of input terminals;

a rectifying means having one terminal connected to an intermediate point between said primary winding of said transformer and said switching element; and an electrical charge accumulating device connected in series with another terminal of said rectifying means; wherein during an on-period of said switching element, a first direct current output is obtained from both terminals of said secondary winding of said transformer for deriving said first direct current and supplying said first direct current across said first pair of output terminals for said first load, and during an off-period of said switching means, by transferring excitation energy accumulated in said primary winding of said transformer to said electrical charge accumulating device through said rectifying means, a second direct current output is obtained from both terminals of said electrical charge accumulating device for deriving said second direct current and supplying said second direct current across said second pair of output terminals for said second load.

16. A multi-output DC-DC convertor for supplying a first direct current to a first load and a second direct current to a second load, comprising:

a pair of input terminals, a first pair of output terminals which pair is different from said pair of input terminals, and a second pair of output terminals which pair is different from said pair of input terminals;

a transformer having a primary winding and a secondary winding;

at least one switching element connected between a direct power source and said primary winding of said transformer such that a series circuit of said primary winding and said at least one switching element are connected to said direct power source across said pair of input terminals;

a rectifying circuit having one electrode connected to an intermediate point between said switching element and said primary winding of said transformer; and an electrical charge accumulating device connected in series with another electrode of said switching dement;

a voltage stabilizing circuit connected to both ends of said electrical charge accumulating device; and a synchronous rectifying circuit, having metal oxide semiconductor field effect transistors, connected to said secondary winding of said transformer;

wherein, during an on-period of said switching element, a first direct current output is obtained from both terminals of said secondary winding of said transformer for deriving said first direct current and supplying said first direct current across said first pair of output terminal for said first load, and during an off-period of said switching element, by transferring excitation energy accumulated in said primary winding of said transformer to said electrical charge accumulating device through said rectifying circuit, a second direct current output is obtained from both terminals of said electrical charge accumulating device for deriving said second direct current and supplying said second direct current across said second pair of output terminals for said second load.

17. A multi-output DC-DC converter according to claim 5, wherein one terminal of said electrical charge accumulating device is connected to a low potential side of a direct current power source, and said second direct current output is a negative potential with respect to said low potential side of said direct current power source, said at least one switching element, said transformer and ground are connected in series in the stated order starting from a high potential side of said direct current power source to said low potential side of said direct current power source, and said rectifying circuit is a diode having a cathode connected to said intermediate point.

* * * * *